United States Patent Office 2,710,548
Patented June 14, 1955

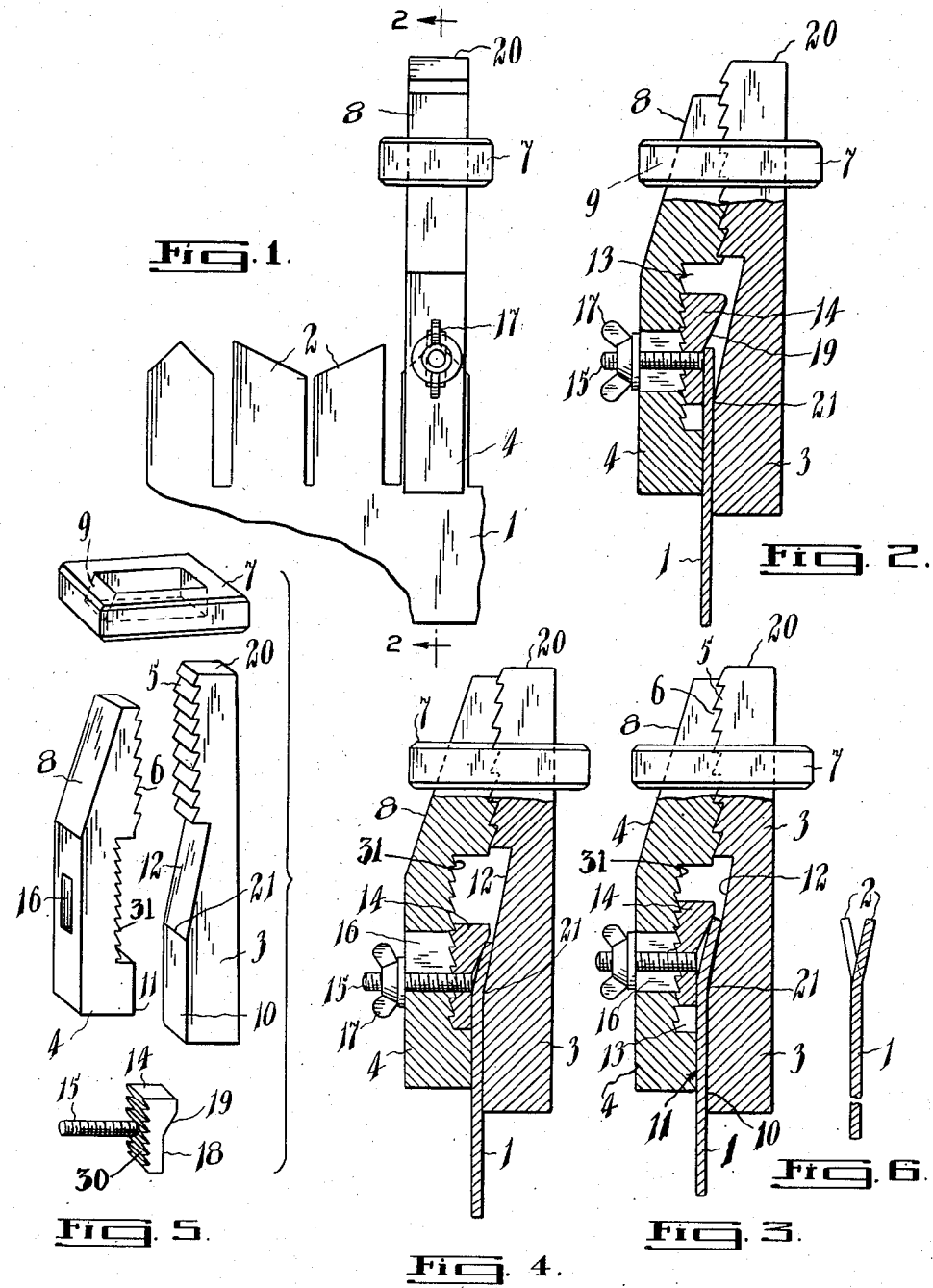

2,710,548

CROSS CUT SAW PUNCH SET

Isaiah De Washa, Bala, Ontario, Canada

Application January 12, 1954, Serial No. 403,547

1 Claim. (Cl. 76—72)

This invention relates to devices for setting the teeth of saws to provide a kerf having sufficient width or clearance to prevent binding or gripping of the saw blade during the cutting operation. The amount of set or inclination of the teeth required varies for different kinds of wood or other material, and also varies at different seasons of the year. For example, when sawing the same type of wood, more set is required in warm weather than is required during cold weather, and also greater set is required to satisfactorily cut pine, hemlock and other soft woods than is required to cut maple, oak, birch or other hard woods.

The object of the present invention therefore is to device a very simple form of sawset which is particularly adapted for setting the teeth of a saw of the type having large teeth, such, for example, as a cross cut saw, or a circular power saw having teeth of similar size, and which, while applied individually to set each tooth, will ensure that all the teeth will have substantially the same amount of set or inclination.

A further object of the invention is to devise a saw set which may readily be adjusted to give the teeth the particular set or inclination best suited for cutting a certain type of wood or other material under the temperature conditions prevailing at the time the cutting is to be done.

A still further object is to device a saw set which is easy to use and by means of which persons unskilled in setting saw teeth may readily set the teeth of a saw blade to provide a satisfactory cutting edge.

These objects, as well as other objects which will hereinafter appear, are attained by forming the saw set of a pair of co-operating jaw members provided at one end between their adjacent surfaces with a mouth or slot into which the teeth of the saw may be projected one by one, which mouth comprises a straight outer portion and an inclined inner portion, into which mouth the teeth may be forced individually in order that all the teeth may have the same amount of set. These jaw members, adjacent their contacting ends, are provided with interlocking means to prevent longitudinal slippage of the jaws relative to one another during the setting operation.

One of the jaw members is provided with a recess in which is seated an anvil member, which is interlocked with the adjacent surface of the jaw to prevent relative longitudinal slippage, but which may be adjusted, when desired, relative to said jaw member to vary the amount of set applied to the teeth.

The improved saw set is hereinafter more specifically described and is illustrated in the accompanying drawings in which:

Fig. 1 is a front elevation showing the saw set applied to the tooth of a cross cut saw;

Fig. 2 is a section on the line 2—2 in Fig. 1 before the tooth has been set;

Fig. 3 is a similar view showing the tooth after it has been set;

Fig. 4 is a similar view with the anvil member in a position for giving less set to the tooth;

Fig. 5 is a perspective view showing the various components of the saw set in separated relationship; and Fig. 6 is a cross section of part of a saw blade.

In the drawings like numerals of reference indicate corresponding parts in the different figures.

1 indicates a portion of an ordinary cross cut saw blade, of which 2 are the teeth. The outer or cutting ends of certain teeth are inclined or set to one side, while the cutting ends of other teeth are inclined in the opposite direction as shown in Fig. 6 in order that the kerf or cut formed by the teeth is of sufficient width to avoid any binding of the wood against the sides of the saw blade as the blade is drawn back and forth through the kerf.

The present invention, however, is concerned with an improved saw set for applying the desired set or inclination to the ends of the teeth to provide a kerf wide enough to give the necessary clearance to facilitate the cutting operation.

The improved saw set comprises a pair of co-operating jaw members 3 and 4, which contact one another for a distance at one end as shown. The contacting portions of the faces are provided with interfitting teeth or serrations 5 and 6 to prevent relative endwise movement, and a clamping member 7 sleeved over the contacting portions of the jaw members holds them tightly together.

The jaw member 4 has the outer side of its upper end inclined as shown at 8, and the portion 9 of the clamping member which contacts therewith is correspondingly inclined to give a wedging effect to hold the jaw members tightly together.

The other ends of the jaw members, when in working position, are spaced apart sufficiently to form a mouth or slot between the parellel faces 10 and 11 of the jaws 3 and 4 respectively.

Above the face 10 of the jaws 3, its surface is inclined inwardly as indicated to form a guide face 12 of considerable length against which the saw tooth may be bent.

Above the face portion 11 of the jaw 4 is formed a recess 13 in which is fitted an anvil member 14, which may be adjusted longitudinally of said recess. The anvil member 14 is supplied with teeth 30 which mate with teeth 31 supplied on the bottom of the recess 13. The mating teeth 30, 31 are suited to positively prevent slippage of the anvil member longitudinally of the recess.

The anvil member 14 is provided with a threaded pin 15, which extends through a slot 16 in the jaw member 4, and the projecting end of the pin has a thumb nut 17 thereon to clamp the anvil member in place as adjusted against the bottom of the recess 13.

The face of the anvil member nearest the jaw member 3 has a straight portion 18 in alignment with the face portion of the jaw member 4 and beyond it an inclined cam portion 19. It is this inclined cam portion 19 of the anvil member which actually effects the setting or bending of the saw teeth, the bend taking place on the line of juncture 21 between the straight surface 10 and the inclined surface 12 of the jaw member 3.

The saw set is used as follows. The two jaw members are positioned longitudinally of the saw tooth, as indicated in Figs. 1 and 2, with the tooth 2 projecting upwardly and engaging the lower end of the inclined cam portion 10 of the anvil member as shown in Fig. 2. Bending or setting of the tooth is effected by hitting the upper end of the strike face 20 of the jaw member 1 by means of a hammer or other tool to force the saw set downwardly over the tooth, thus forcing the upper end of the tooth above the line of juncture 21 to be bent to one side by the inclined cam portion 19 as indicated in Fig. 3.

It will be noted that the co-operating teeth 5 and 6 and the co-operating teeth on the anvil member and the bottom of the recess resist relative movement of the parts of the saw set under the blows of the hammer.

It will be noted that the co-operating teeth each have one side extending at right angles to the plane of the saw blade to prevent any tendency of the teeth to ride upwardly on one another under the blows of the hammer.

The same procedure is employed for each tooth of the saw, except, however, that the saw set has to be turned around to face in the opposite direction.

If a less amount of set is necessary, the anvil member will be adjusted downwardly as shown in Fig. 4, while if greater set is required, the anvil member may be adjusted upwardly, that is, inwardly of the mouth. It will thus be seen that by a simple adjustment in position of the anvil member to change the distance between the line of juncture 21 and the inclined face 19 of the anvil member, the amount of set may be very conveniently regulated. Unless the anvil member is changed in position, the teeth will all be set to the same extent.

It will be seen that I have devised a very simple saw-setting device comprising a minimum number of parts, and by means of which a uniform set may be applied to all the teeth of the saw, and which provides a simple form of adjustment to permit variation in the amount of set applied as desired.

What I claim is:

A sawset comprising a first jaw member and a second jaw member forming a pair of co-acting jaw members having longitudinal extent and having upper end parts supplied with inner faces extending longitudinally of said members, said jaw members extending alongside each other and provided with mating teeth on said inner faces by which the jaw members are held against relative longitudinal movement, means holding the jaw members together to prevent disengagement of the mating teeth, said jaw members having lower end parts provided with spaced inner faces forming a slot of a width to admit a saw blade, said first jaw member having a recess at the inner end of said slot and said recess having a toothed bottom, said first jaw member also having a transverse slot which breaks into said toothed bottom of the recess, an anvil member located in said recess and having a toothed face engaged with the teeth of said bottom for longitudinal positive adjustment of the anvil in said recess, a threaded pin rigid with said anvil and extending loosely through said transverse slot to the outside of said first jaw member, and a nut on the outer end of said threaded pin for tightening against said first jaw member to lock the anvil in adjusted position, the structure being characterised in that the anvil is provided with an inclined cam face for co-acting with a guide face provided on said second jaw member for setting a tooth of a saw when said second jaw member is hit as by a hammer.

References Cited in the file of this patent

UNITED STATES PATENTS

| 389,644 | Gates | Sept. 18, 1888 |
| 688,151 | Adams | Dec. 3, 1901 |
| 1,464,172 | Faunce | Aug. 7, 1923 |
| 2,409,311 | Platter | Oct. 15, 1946 |